(12) United States Patent
Bauer et al.

(10) Patent No.: US 8,794,031 B2
(45) Date of Patent: Aug. 5, 2014

(54) METHOD FOR SEPARATING OFF NITROGEN FROM NATURAL GAS

(75) Inventors: Heinz Bauer, Ebenhausen (DE); Georg Schopfer, Munich (DE); Jurgen Witte, Munich (DE)

(73) Assignee: Linde Aktiengesellschaft, Munxhwn (DE)

( * ) Notice: Subject to any disclaimer, the term of this patent is extended or adjusted under 35 U.S.C. 154(b) by 346 days.

(21) Appl. No.: 13/215,320

(22) Filed: Aug. 23, 2011

(65) Prior Publication Data
US 2012/0047946 A1 Mar. 1, 2012

(30) Foreign Application Priority Data
Aug. 24, 2010 (DE) .......................... 10 2010 035 230

(51) Int. Cl.
*F25J 3/02* (2006.01)
(52) U.S. Cl.
CPC .............. *F25J 3/0257* (2013.01); *F25J 3/0233* (2013.01)
USPC ............................ 62/630; 620/620; 620/927
(58) Field of Classification Search
CPC ....... F25J 1/0257; F25J 1/0072; F25J 1/0082; F25J 1/0092; F25J 3/061; F25J 3/65; F25J 3/66; F25J 3/0257; F25J 3/0209; F25J 3/0233; F25J 2200/06; F25J 2200/38; F25J 2200/72; F25J 2200/74; F25J 2200/78; F25J 2210/42; F25J 2290/40; F25J 2220/62; F25J 2220/44

USPC .................... 62/618, 619, 621, 622, 630, 927
See application file for complete search history.

(56) References Cited

U.S. PATENT DOCUMENTS

| | | | | | |
|---|---|---|---|---|---|
| 4,230,469 | A | * | 10/1980 | Grimm et al. .................... | 62/623 |
| 4,256,476 | A | * | 3/1981 | Van Baush ....................... | 62/612 |
| 4,451,275 | A | * | 5/1984 | Vines et al. ...................... | 62/622 |
| 5,257,505 | A | | 11/1993 | Butts | |
| 5,421,165 | A | * | 6/1995 | Paradowski et al. ............. | 62/621 |
| 5,617,741 | A | * | 4/1997 | McNeil et al. ................... | 62/622 |
| 5,678,426 | A | * | 10/1997 | Agrawal et al. .................. | 62/647 |
| 5,970,742 | A | * | 10/1999 | Agrawal et al. .................. | 62/630 |
| 6,263,700 | B1 | * | 7/2001 | Agrawal et al. .................. | 62/646 |
| 7,858,813 | B2 | * | 12/2010 | Herguijuela et al. .......... | 549/413 |
| 2004/0103687 | A1 | * | 6/2004 | Clare et al. ....................... | 62/621 |
| 2008/0000265 | A1 | * | 1/2008 | Cuellar et al. ................... | 62/630 |

* cited by examiner

*Primary Examiner* — Frantz Jules
*Assistant Examiner* — Brian King
(74) *Attorney, Agent, or Firm* — Millen, White, Zelano & Branigan, P.C.

(57) ABSTRACT

The invention relates to a method for resolving a hydrocarbon-rich, nitrogen-containing feed fraction (1, 1'), preferably natural gas, is described, wherein the feed fraction (1, 1') is separated by rectification (T1, T2) into a nitrogen-enriched fraction (5) and a hydrocarbon-rich, nitrogen-depleted fraction (10), and wherein the separation by rectification proceeds in a rectification column consisting of a preseparation column (T1) and a main separation column (T2). A liquid fraction (6) is taken off from the main separation column (T2) above the feed-in site(s) of the fraction (7, 7', 7") that is taken off from the preseparation column (T1) and fed to the main separation column (T2), and the liquid fraction (6) is applied to the preseparation column (T1) as reflux.

18 Claims, 1 Drawing Sheet

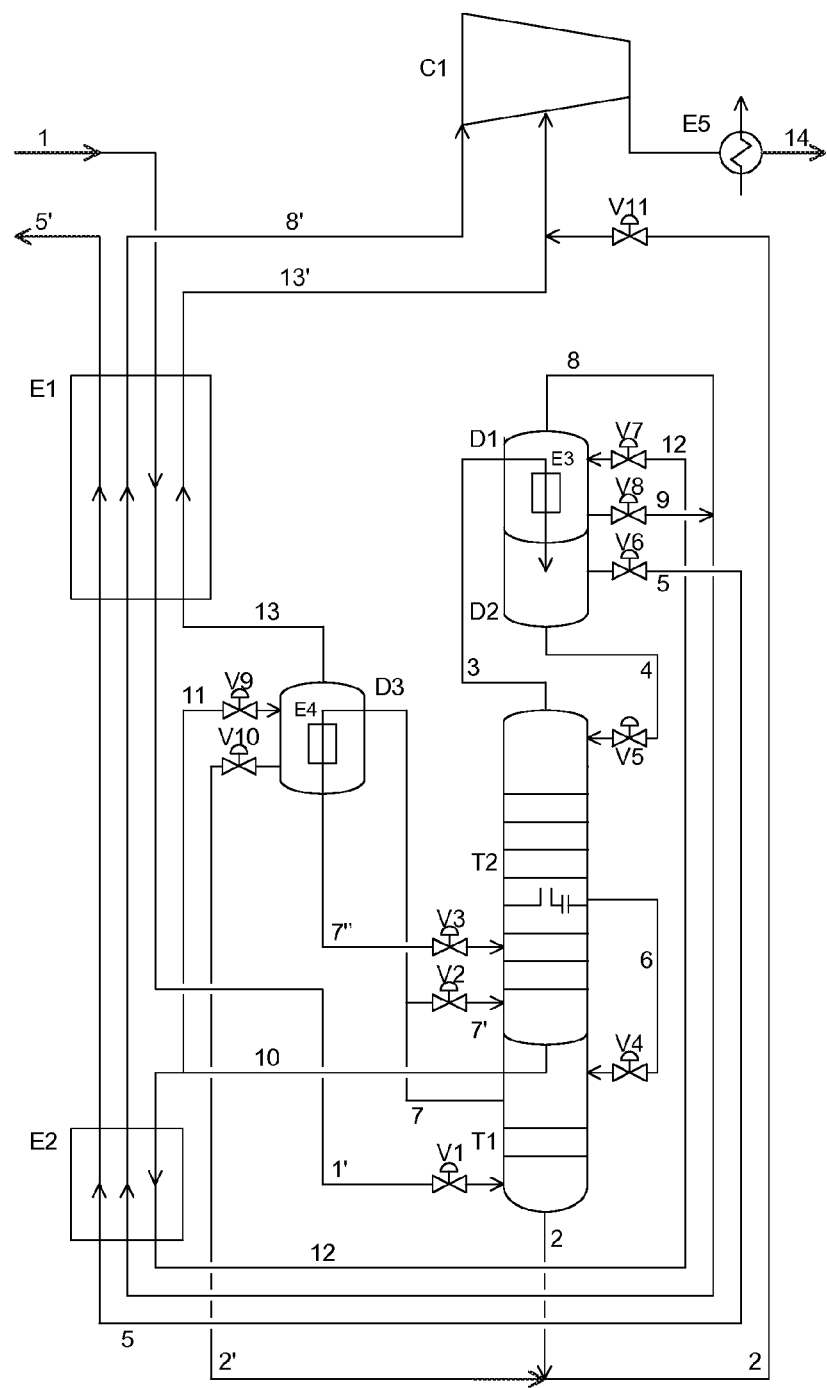

METHOD FOR SEPARATING OFF NITROGEN FROM NATURAL GAS

SUMMARY OF THE INVENTION

The invention relates to a method for resolving a hydrocarbon-rich, nitrogen-containing feed fraction, preferably natural gas, wherein the feed fraction is separated by rectification into a nitrogen-enriched fraction and a hydrocarbon-rich, nitrogen-depleted fraction and the separation by rectification proceeds in a rectification column having a preseparation column and a main separation column.

Methods of the type in question for liquefying natural gas in which nitrogen is separated off cryogenically and which, for this reason, have what is termed a Nitrogen Rejection Unit (NRU), are known from the prior art. Separating off nitrogen cryogenically from hydrocarbon-rich gas fractions, for example from natural gas or from the residual gas of a natural gas liquefaction process, clearly proceeds at very low temperatures, since the rectification of the key components, nitrogen and methane, must proceed at least in part below the critical temperature of nitrogen (−147° C.).

In order to enable faultless operation, all components of the hydrocarbon-rich, nitrogen-containing feed fraction that are at hazard of freezing must be kept away from the low-temperature plant parts, inter alia from the top condenser of the rectification column to be provided. These components include, apart from water and carbon dioxide, higher hydrocarbons from butane, since the freezing points thereof are higher than the critical temperature of nitrogen.

Water in this case is usually removed by fixed-bed adsorbers. Carbon dioxide can be tolerated by means of a suitable process procedure up to a content in the feed fraction of approximately 2% by volume, or is removed by means of an amine scrubbing.

U.S. Pat. No. 5,257,505 discloses what is termed a single-column method; in this method the hydrocarbon-rich, nitrogen-containing feed fraction is separated in a single rectification column. Single-column methods are economically attractive owing to comparatively low capital costs, in particular at low nitrogen concentrations of less than approximately 30 mol % in the feed fraction. In the case of the process procedure described in U.S. Pat. No. 5,257,505, a nitrogen-rich fraction is taken off at the top of the rectification column. The hydrocarbon-rich bottom-phase product of the rectification column, after expansion to low pressure—this is typically between 1.5 and 3 bara—is in part used as refrigerant for the top condenser of the rectification column. During the vaporization of the refrigerant that proceeds in the top condenser of the rectification column, higher hydrocarbons (from butane) can lead to an obstruction due to solids formation.

An object of the present invention is to provide a method of the type in question for resolving a hydrocarbon-rich, nitrogen-containing feed fraction, which avoids the disadvantages, and, in particular, avoids obstructions due to solids formation, and impairments resulting therefrom of the operation of the rectification column or of the top condenser thereof.

Upon further study of the specification and appended claims, other objects and advantages of the invention will become apparent.

For achieving these objects, a method is proposed for resolving a hydrocarbon-rich, nitrogen-containing feed fraction, in which a liquid fraction is removed from the main separation column above the feed-in site(s) of a fraction that is removed from the preseparation column and fed to the main separation column, and the liquid fraction is applied to the preseparation column as reflux.

According to the invention, now, a liquid fraction from the main separation column is used as reflux for the preseparation column, which liquid fraction is taken off from this main separation column above the feed-in site(s) of the fraction taken off from the preseparation column and fed to the main separation column. At this take-off point of the main separation column, the content of higher hydrocarbons—in this case, butane and higher hydrocarbons—is comparatively low and is typically less than 1 ppm. By means of this reflux stream, in the preseparation column higher hydrocarbons can be removed from the feed fraction at concentration ranges of less than 1 ppm. The concentration of higher hydrocarbons in the overhead product of the preseparation column which is fed to the main separation column is corresponding low. The bottom-phase product of the preseparation column consequently has the majority, preferably at least 95%, of the higher hydrocarbons present in the feed fraction. By means of the procedure according to the invention, now the higher hydrocarbons can be kept away from the bottom-phase product of the main separation column.

In a development of the method according to the invention for resolving a hydrocarbon-rich, nitrogen-containing feed fraction, it is proposed that the take-off point and/or the amount of the liquid fraction used as reflux for the preseparation column is or are selected in such a manner that the hydrocarbon-rich, nitrogen-depleted fraction taken off from the bottom phase of the main separation column has a proportion of higher hydrocarbons of less than 1 ppm. It is ensured thereby that the bottom-phase product of the main separation column is free from unwanted components which would lead to obstructions in the vaporization in the top condenser of the rectification or the main separation column. In this manner, fault-free operation with respect to higher hydrocarbons can be ensured.

BRIEF DESCRIPTION OF THE DRAWINGS

The invention is illustrated schematically with reference to an exemplary embodiment in the drawing and will be described extensively hereinafter with reference to the drawing. Various other features and attendant advantages of the present invention will be more fully appreciated as the same becomes better understood when considered in conjunction with the accompanying drawing wherein:

FIG. 1 illustrates an embodiment according to the invention.

Via line 1, the hydrocarbon-rich feed fraction, which is, for example, a natural gas stream, is conducted through the heat exchanger E1 and cooled therein against process streams that are to be warmed, which will be considered in yet more detail hereinafter. After passage through the heat exchanger E1, the feed fraction is fed via the line 1' and expansion valve V1 to the rectification or rectification column. The rectification column consists in this case of a preseparation column T1 and also a main separation column T2.

A methane-rich, nitrogen-depleted fraction is taken off from the bottom phase of the preseparation column T1 via line 2 and fed via valve V11 to a methane-rich fraction in line 13', which will be further considered in more detail hereinafter.

From the top region of the preseparation column T1, a methane-rich gas fraction is taken off via line 7 and is at least partially liquefied in the heat exchanger E4 of a bath-type evaporator. This bath-type evaporator consists of a heat exchanger E4 arranged in a container D3, wherein the medium that is to be vaporized is conducted into the container. Then, the at least partially liquefied fraction is fed via line 7" and expansion valve V3 to the main separation column T2. A substream of the fraction taken off via line 7 can be fed directly to the main separation column T2 via line 7' and expansion valve V2, in addition to the abovementioned fraction 7".

The pressure drop of the methane-rich gas fraction taken off from the top region of the preseparation column T1 via line 7 is kept comparatively low through the valves V2 and V3 and also the heat exchanger E4—it is less than 300 mbar, preferably less than 200 mbar—in such a manner that a pump in reflux line 6 can be dispensed with. The pressure difference between the preseparation column T1 and the main separation column T2 is compensated for via the hydrostatic pressure of the liquid in the return line 6 upstream of the valve V4.

According to the invention, above the feed-in sites of fractions 7' and 7", a liquid fraction is taken off from the main separation column T2 via line 6, and said liquid fraction is applied as reflux via the expansion valve V4 to the preseparation column T1. In this case, take-off point and/or amount of the liquid fraction 6 used as reflux for the preseparation column T1 are selected in such a manner that the methane-rich, nitrogen-depleted fraction taken off from the bottom phase of the main separation column T2 via line 10 has a proportion of higher hydrocarbons of less than 1 ppm.

A substream of the bottom-phase product taken off from the bottom phase of the main separation column T2 via line 10 is fed via line 11 and expansion valve V9 to the bath-type evaporator D3/E4 and vaporized at an average pressure of 10 to 40 bar, preferably 20 to 30 bar. The vaporized fraction is taken off from the top of the bath-type evaporator via line 13, warmed in the heat exchanger E1 and fed via line 13' to a multistage compression C1.

The remaining substream of the bottom-phase product taken off from the bottom phase of the main separation column T2 via line 10 is cooled in the heat exchanger E2 against process streams which are to be warmed which will be further considered in more detail hereinafter, and then fed via line 12 and expansion valve V7 to a further bath-type evaporator consisting of a heat exchanger E3 arranged in a container D1. Therein, this fraction is vaporized at a low pressure of 1.2 to 5 bar, preferably 1.5 to 3 bar and then taken off at the top of the bath-type evaporator via line 8. The methane-rich fraction taken off via line 8 is warmed in the heat exchangers E2 and E1 against process streams which are to be cooled and is then fed via line 8' to the multistage compressor C1. Therein, the methane-rich fractions 8' and 13' that are present at different pressure levels are "combined" and compressed to the desired delivery pressure. After passage through the after-cooler E5, the methane-rich product fraction is taken off from the process via line 14.

At the top of the main separation column T2, a nitrogen-rich gas fraction is taken off via line 3, at least partially condensed in the bath-type evaporator D1/E3 and then flows into the reflux collector D2. The liquid phase from the reflux collector D2 is applied via line 4 and expansion valve V5 to the main separation column T2 in the top region thereof as reflux. The gas phase of the fraction partially condensed in the bath-type evaporator is removed the reflux collector (D2) via expansion valve V6 and line 5, warmed in the heat exchangers E2 and E1 against process streams that are to be cooled and delivered from the process via line 5'.

The pressure drop of the nitrogen-rich gas fraction that is taken off from the top region of the main separation column T2 via line 3 is kept relatively low through the heat exchanger E3—it is less than 300 mbar, preferably less than 200 mbar—in such a manner that a pump in the reflux line 4 can be dispensed with. The pressure difference between the main separation column T2 and the reflux collector D2 is compensated for via the hydrostatic pressure of the liquid in the reflux line 4 upstream of the valve V5.

An unwanted enrichment of higher hydrocarbons in the containers D1 and D3 is prevented by discharging liquid via the line 9 and valve V8 or line 2' and valve V10.

The method according to the invention for resolving a hydrocarbon-rich, nitrogen-containing feed fraction makes it possible to implement a resolution process in which the higher hydrocarbons can be safety kept away from the bottom-phase product of the main separation column.

The entire disclosure[s] of all applications, patents and publications, cited herein and of corresponding German Application No. DE 10 2010 035230.6, filed Aug. 24, 2010 are incorporated by reference herein.

The preceding examples can be repeated with similar success by substituting the generically or specifically described reactants and/or operating conditions of this invention for those used in the preceding examples.

The invention claimed is:

1. A method for resolving a hydrocarbon-rich, nitrogen-containing feed fraction (1, 1'), comprising:
    separating the feed fraction (1, 1') by rectification (T1, T2) into a nitrogen-enriched fraction (5) and a hydrocarbon-rich, nitrogen-depleted fraction (10), wherein the separation by rectification is conducted in a rectification column comprising a preseparation column (T1) and a main separation column (T2), and
    removing a liquid fraction (6) from said main separation column (T2) above the feed-in site(s) of a fraction (7, 7', 7") that is removed from said preseparation column (T1) and fed to said main separation column (T2), and said liquid fraction (6) from said main separation column (T2) is applied to said preseparation column (T1) as reflux.

2. A method according to claim 1, wherein the feed fraction (1, 1') is natural gas.

3. A method according to claim 1, wherein the take-off point of said liquid fraction (6) is selected so that the hydrocarbon-rich, nitrogen-depleted fraction (10) which is removed from a bottom region of the main separation column (T2), has a proportion of higher hydrocarbons of less than 1 ppm.

4. A method according to claim 1, wherein the amount of the liquid fraction (6) used as reflux for the preseparation column (T1) is selected so that the hydrocarbon-rich, nitrogen-depleted fraction (10), which is removed from a bottom region of the main separation column (T2), has a proportion of higher hydrocarbons of less than 1 ppm.

5. A method according to claim 1, wherein the take-off point of said liquid fraction (6) and the amount of said liquid fraction (6) used as reflux for the preseparation column (T1) are selected so that the hydrocarbon-rich, nitrogen-depleted fraction (10), which is removed from a bottom phase of the main separation column (T2), has a proportion of higher hydrocarbons of less than 1 ppm.

6. A method according to claim 2, wherein the take-off point of said liquid fraction (6) is selected so that the hydrocarbon-rich, nitrogen-depleted fraction (10),which is removed from the bottom region of the main separation column (T2), has a proportion of higher hydrocarbons of less than 1 ppm.

7. A method according to claim 2, wherein the amount of the liquid fraction (6) used as reflux for the preseparation column (T1) is selected so that the hydrocarbon-rich, nitrogen-depleted fraction (10), which is removed from a bottom region of the main separation column (T2), has a proportion of higher hydrocarbons of less than 1 ppm.

8. A method according to claim 2, wherein the take-off point of said liquid fraction (6) and the amount of said liquid fraction (6) used as reflux for the preseparation column (T1) are selected so that the hydrocarbon-rich, nitrogen-depleted fraction (10), which is removed from a bottom phase of the main separation column (T2), has a proportion of higher hydrocarbons of less than 1 ppm.

9. A method according to claim 1, wherein said fraction (7) removed from said preseparation column (T1) is a methane-rich gas, and is partially liquefied in a bath-type evaporator, expanded and then fed to said main separation column (T2).

10. A method according to claim 9, wherein a portion (7') of said fraction (7) removed from said preseparation column (T1) is branched off before the remainder of the fraction (7) removed from said preseparation column (T1) is partially liquefied in said bath-type evaporator (D3/E4), and said portion (7') of said fraction (7) removed from said preseparation column (T1) is expanded and then fed to said main separation column (T2).

11. A method according to claim 1, wherein the pressure drop for said fraction (7) removed from said preseparation column (T1),between said preseparation column (T1) and said the main separation column (T2), is less than 300 mbar.

12. A method according to claim 1, wherein said hydrocarbon-rich, nitrogen-depleted fraction (10) is removed from a bottom region of said main separation column (T2), and said hydrocarbon-rich, nitrogen-depleted fraction (10) has a proportion of butane and higher hydrocarbons of less than 1 ppm.

13. A method according to claim 1, wherein said hydrocarbon-rich, nitrogen-depleted fraction (10) is removed is removed from a bottom region of said main separation column (T2), and a portion (11) of said hydrocarbon-rich, nitrogen-depleted fraction (10) is fed to a bath-type evaporator (D3/E4), vaporized at an average pressure of 10 to 40 bar, and the resultant vaporized fraction is removed (13) from said bath-type evaporator, warmed by heat exchange (E1) and fed to a multistage compression (C1).

14. A method according to claim 1, wherein said hydrocarbon-rich, nitrogen-depleted fraction (10) is removed from a bottom region of said main separation column (T2), cooled in a heat exchanger (E2), delivered to a bath-type evaporator (D1/E3), vaporized at a pressure of 1.2 to 5 bar, removed (8) from said bath-type evaporator, warmed by heat exchange (E2, E1), and then fed to a multistage compressor (C1).

15. A method according to claim 13, wherein said hydrocarbon-rich, nitrogen-depleted fraction (10) is removed from a bottom region of said main separation column (T2), cooled in a heat exchanger (E2), delivered to a bath-type evaporator (D1/E3), vaporized at a pressure of 1.2 to 5 bar, removed (8) from said bath-type evaporator, warmed by heat exchange (E2, E1), and then fed to said multistage compressor (C1).

16. A method according to claim 1, wherein a nitrogen-rich gas fraction is removed (3) from the top of said main separation column (T2) via line (3), at least partially condensed in a bath-type evaporator (D1/E3) and delivered to a reflux collector (D2).

17. A method according to claim 1, wherein a liquid phase is removed (4) from said reflux collector (D2) and delivered into a top region of said main separation column (T2) as reflux.

18. The method of claim 1, wherein said liquid fraction (6) from said main separation column (T2) is expanded in an expansion valve before being applied to said preseparation column (T1) as reflux.

\* \* \* \* \*